(12) United States Patent
Murata et al.

(10) Patent No.: US 11,101,125 B2
(45) Date of Patent: Aug. 24, 2021

(54) SAMPLE PLATE FOR PESI ION SOURCE AND MASS SPECTROMETER USING THE SAME

(71) Applicant: SHIMADZU CORPORATION, Kyoto (JP)

(72) Inventors: Tasuku Murata, Kyoto (JP); Takeshi Uchida, Kyoto (JP); Koretsugu Ogata, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 66 days.

(21) Appl. No.: 16/606,382

(22) PCT Filed: Aug. 31, 2017

(86) PCT No.: PCT/JP2017/020253
§ 371 (c)(1),
(2) Date: Oct. 18, 2019

(87) PCT Pub. No.: WO2018/220742
PCT Pub. Date: Dec. 6, 2018

(65) Prior Publication Data
US 2021/0175064 A1    Jun. 10, 2021

(51) Int. Cl.
*H01J 49/16*     (2006.01)
*H01J 49/04*     (2006.01)
*H01J 49/14*     (2006.01)

(52) U.S. Cl.
CPC ........ *H01J 49/165* (2013.01); *H01J 49/0409* (2013.01); *H01J 49/14* (2013.01)

(58) Field of Classification Search
CPC .... H01J 49/0409; H01J 49/0431; H01J 49/14; H01J 49/165; G01N 27/62; G01N 27/622
See application file for complete search history.

(56) References Cited

U.S. PATENT DOCUMENTS 5,705,813 A    1/1998  Apffel et al.
5,716,825 A *  2/1998  Hancock .............. B01J 19/0093
                                              250/288
(Continued)

FOREIGN PATENT DOCUMENTS

CA      2 227 331 C    4/2002
DE    196 43 921 A1    5/1997
(Continued)

OTHER PUBLICATIONS

Mandal et al, "Detection of Protein from Detergent Solutions by Probe Electrospray Ionization Mass Spectrometry", J. Mass Spectrom. 2011, 46, 967-975 (Year: 2011).*

(Continued)

*Primary Examiner* — David E Smith
(74) *Attorney, Agent, or Firm* — Sughrue Mion, PLLC

(57) ABSTRACT

A sample plate for a solid sample includes a plate-shaped main body and lid. The main body has a concave portion, in which a sample placement platform shaped like a cylinder protrudes from the central area of the bottom surface of the concave portion. The lid has a funnel-shaped opening bored at a position immediately above the concave portion. The diameter of the opening on the lower side is approximately the same as that of the sample placement platform. After a sample, e.g. a biological tissue section, is placed in the concave portion, the lid is closed. Then, the lower wall surface of the lid surrounding the opening presses the sample downward. The sample is thereby sandwiched between the lower wall surface and the sample placement platform. A solvent for ionization is injected into the opening whose lower side is thus closed by the sample.

5 Claims, 6 Drawing Sheets

(56) References Cited

U.S. PATENT DOCUMENTS

| | | | |
|---|---|---|---|
| 5,872,010 A | 2/1999 | Karger et al. | |
| 6,068,825 A * | 5/2000 | Tsunematsu | C01B 33/187 |
| | | | 423/335 |
| 6,086,825 A * | 7/2000 | Sundberg | B01J 19/0093 |
| | | | 204/600 |
| 2002/0104795 A1* | 8/2002 | Cote | B01L 3/5025 |
| | | | 210/323.2 |
| 2003/0066957 A1 | 4/2003 | Andersson et al. | |
| 2005/0136546 A1* | 6/2005 | Berndt | B01L 3/5085 |
| | | | 436/45 |
| 2006/0043284 A1 | 3/2006 | Baba et al. | |
| 2007/0264170 A1 | 11/2007 | Barthe et al. | |
| 2008/0163702 A1* | 7/2008 | Sunwoldt | G01Q 30/14 |
| | | | 73/864.91 |
| 2011/0120562 A1 | 5/2011 | Tan et al. | |
| 2012/0219473 A1* | 8/2012 | Ishii | B01L 7/00 |
| | | | 422/561 |
| 2013/0053281 A1 | 2/2013 | Zarrine-Afsar et al. | |
| 2016/0199835 A1 | 7/2016 | Tachibana et al. | |
| 2017/0236699 A1 | 8/2017 | Ueda et al. | |

FOREIGN PATENT DOCUMENTS

| | | |
|---|---|---|
| EP | 0 840 886 A1 | 5/1998 |
| GB | 2 306 643 A | 5/1997 |
| JP | 2002-515820 A | 5/2002 |
| JP | 2014-044110 A | 3/2014 |
| WO | 97/04297 A1 | 2/1997 |
| WO | 2004/051228 A1 | 6/2004 |
| WO | 2016/027319 A1 | 2/2016 |

OTHER PUBLICATIONS

Communication dated Sep. 3, 2020, from the European Patent Office in application No. 17911536.5.
Sen Takeda, Ph.D. et al., "Developing a Novel Cancer Diagnostic System Based on the Mass Spectrometry and Learning Machine", Shimadzu Review, Mar. 2013, vol. 69, No. 3/4, pp. 203-210.
Mridul Kanti Mandal et al., Detection of protein from detergent solutions by probe electrospray ionization mass spectrometry (PESI-MS), Journal of Mass spectrometry, Aug. 2011, pp. 967-975, vol. 46.
Written Opinion for PCT/JP2017/020253, dated Aug. 15, 2017.
International Search Report for PCT/JP2017/020253, dated Aug. 15, 2017.
Partial Supplementary European Search Report dated Apr. 28, 2020, from the European Patent Office in Application No. 17911536.5.

* cited by examiner

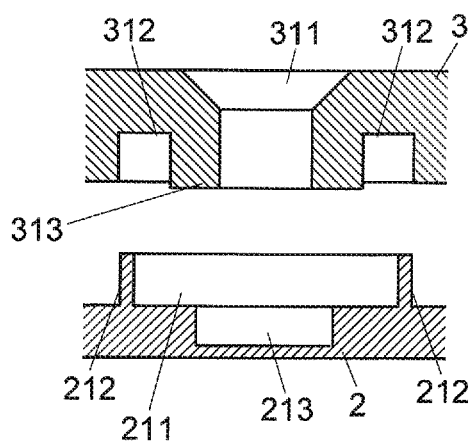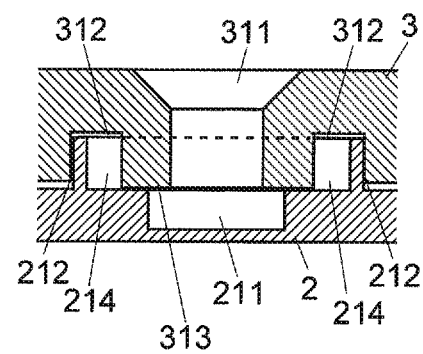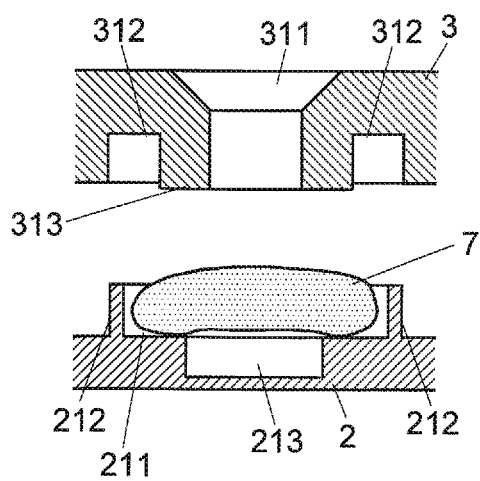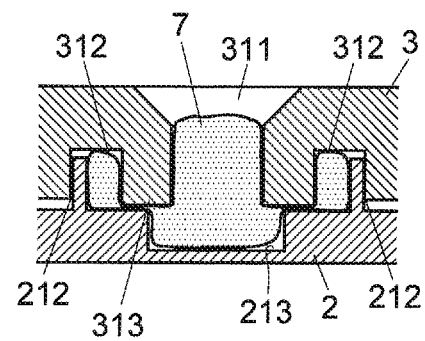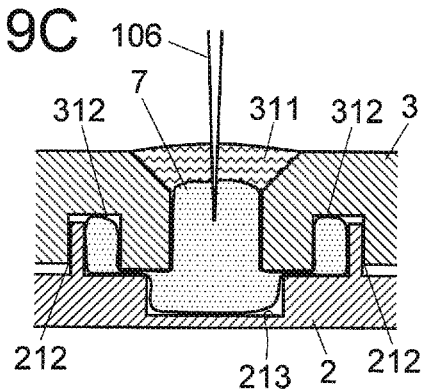

SAMPLE PLATE FOR PESI ION SOURCE AND MASS SPECTROMETER USING THE SAME

CROSS REFERENCE TO RELATED APPLICATIONS

This application is a National Stage of International Application No. PCT/JP2017/020253 filed May 31, 2017.

TECHNICAL FIELD

The present invention relates to a sample plate for an ion source employing a probe electrospray ionization (PESI) method, as well as a mass spectrometer in which such a sample plate is used to perform a measurement.

BACKGROUND ART

Various ionization methods have conventionally been proposed and put to practical use for ionizing a component in a sample prepared as a measurement target in a mass spectrometer. As a type of ionization method in which ionization is performed in an ambience of atmospheric pressure, an electrospray ionization (ESI) method is commonly known. As one of the ionization methods which employ the ESI, a PESI method has been drawing attention in recent years.

The PESI method is a comparatively new ionization technique. As disclosed in Patent Literature 1 or Non-Patent Literature 1, a PESI ion source includes: an electrically conductive probe having a tip with a diameter of several hundred nanometers; a position-changing unit for changing the position of one or both of the probe and a sample so as to make the sample adhere to the tip of the probe; and a high voltage generator for applying a high voltage to the probe with the sample collected on the tip of the probe. In a measurement, the position-changing unit is operated to change the position of one or both of the probe and the sample so that the tip of the probe comes in contact with or slightly pierces the sample and makes a trace amount of sample adhere to the tip surface of the probe. The position-changing unit is subsequently operated to remove the probe from the sample, and a high voltage is applied from the high-voltage generator to the probe. Then, a strong electric field acts on the sample adhered to the tip of the probe and induces the electrospray phenomenon, which causes the molecules of the components in the sample to be ionized while being released.

Since the ionization in the PESI ion source is performed in an ambience of atmospheric pressure, both a solid sample, such as a biological tissue section, and a liquid sample, such as blood, can be treated as a sample to be subjected to the measurement.

In a mass spectrometer which uses a PESI ion source as the ion source (a mass spectrometer using a PESI ion source is hereinafter simply called the "mass spectrometer"), when a measurement for a solid sample is to be performed, it is normally the case that the sample is directly placed on a sample stage, or the sample is placed on a plate held on the sample stage. Then, the sample is pierced with the lowered probe to make the sample adhere to the tip of the probe (see Patent Literature 2 or other related documents).

However, in the case of performing a measurement for a considerable number of samples while sequentially replacing one sample with another, a considerable amount of time and labor will be required for the replacement of the sample.

There is also another problem: It is common that a mass spectrometric analysis be repeatedly performed multiple times for the same sample and the obtained mass spectrometric results are accumulated. In such an analysis, a slice of sample fresh from a living organism may change its position by a small amount and prevent the probe from piercing the same site of the sample, which lowers the reliability of the analysis. Furthermore, the PESI method normally requires a solvent in the process of ionizing the components in a solid sample. Therefore, an additional mechanism for supplying a solvent to the sample adhered to the tip of the probe is required, which makes the device more complex in structure and more expensive.

In the case of a measurement of a liquid sample, for example, a container holding the liquid sample is placed on the sample stage, and the probe is dipped in the liquid sample in the container to make the sample adhere to the tip of the probe. In another method for making the liquid sample adhere to the tip of the sample, a capillary tube through which the liquid sample is supplied is provided so that its outlet end is located within the movable range of the probe, thereby allowing the probe to come in contact with a droplet formed at the outlet end of the capillary tube due to the supply of the liquid sample.

Thus, there is a complete difference between a measurement for a solid sample and a measurement for a liquid sample in terms of the method for setting the sample in the device. Therefore, the measurement task will be extremely cumbersome and significantly lower the measurement efficiency if a measurement for a liquid sample is inserted into a series of measurements for a plurality of solid samples, or conversely, if a measurement for a solid sample is inserted into a series of measurements for a plurality of liquid samples.

CITATION LIST

Patent Literature

Patent Literature 1: JP 2014-44110 A
Patent Literature 2: WO 2016/027319 A

Non Patent Literature

Non Patent Literature 1: Sen Takeda and even other authors, "Developing a Novel Cancer Diagnostic System Based on the Mass Spectrometry and Learning Machine", Shimadzu Review, Vol. 69, No. 3/4, March 2013

SUMMARY OF INVENTION

Technical Problem

The present invention has been developed to solve the previously described problems. Its primary objective is to provide a sample plate for a PESI ion source which can securely hold a solid sample, does not require an additional mechanism for supplying a solvent, and allows a measurement to be efficiently performed, as well as a mass spectrometer using such a sample plate. Another objective of the present invention is to provide a sample plate for a PESI ion source which allows a measurement to be efficiently performed for a plurality of samples even if those samples include solid samples and liquid samples, as well as a mass spectrometer using such a sample plate.

Solution to Problem

A sample plate for a PESI ion source according to the first aspect of the present invention developed for solving the previously described problem is a sample plate for a probe electrospray ionization (PESI) ion source. The sample plate includes a substantially plate-shaped main body and a substantially plate-shaped lid configured to be put on the top surface of the main body, where:

the main body includes a concave portion for containing a sample; and the lid includes a convex portion to be inserted into the concave portion when the lid is closed so as to cover the top surface of the main body, and the convex portion has an opening bored through the convex portion in a top-to-bottom direction.

A sample plate for a PESI ion source according to the second aspect of the present invention developed for solving the previously described problem is a sample plate for a probe electrospray ionization (PEST) ion source. The sample plate includes a substantially plate-shaped main body and a substantially plate-shaped lid configured to be put on the top surface of the main body, where:

the main body includes a concave portion for containing a sample, the concave portion having a bottom surface on which a sample placement platform one level higher than the surrounding area is formed; and the lid has an opening bored through the lid in a top-to-bottom direction at a position above the concave portion when the lid is closed so as to cover the top surface of the main body, where the lower side of the opening is smaller in size than the top opening of the concave portion.

As a typical form of the sample plate for a PESI ion source according to the first or second aspect of the present invention, the sample plate may have an external shape which is substantially a flat rectangular parallelepiped when the lid is closed so as to cover the top surface of the main body.

For example, in the case where the sample plate for a PESI ion source according to the first aspect of the present invention is used for a measurement of a solid sample which is soft to some extent, such as a biological tissue section, the sample is prepared as follows:

With the lid of the sample plate opened, a sample of an appropriate size is placed in the concave portion of the main body. The sample should preferably have a size that is one size smaller than the opening of the concave portion as viewed from above and a height that is slightly larger than the depth of the same concave portion. After the sample is placed in the concave portion, the lid is closed. Then, the convex portion of the lid is inserted into the concave portion of the main body, with the lower surface of the convex portion coming in contact with the sample in the concave portion and squeezing the same sample. Within an area where the opening is formed in the convex portion, a portion of the sample pressed by the lower surface of the convex portion surrounding that area escapes into the same area. Thus, the sample bulges into the opening.

Subsequently, an appropriate amount of solvent is injected (or dropped) into the opening. Since the lower side of the opening is closed by the bulging sample in the previously described manner, the opening in this state functions as a solvent reservoir. Thus, the solvent is stored in the space above the sample contained in the concave portion, being in contact with the upper surface of the same sample. The sample plate with the sample prepared in this manner is set at a predetermined position in the PESI ion source in the mass spectrometer, and the measurement is performed. The tip of the lowered probe is inserted into the opening of the lid and pierces the sample. The probe is subsequently lifted, with a trace amount of sample adhered to the tip of the probe. This sample adhered to the tip of the probe has a sufficient amount of solvent adhered, since the sample passes through the solvent during the lifting motion. In this state, a high voltage is applied to the probe, whereby the components in the sample on the tip of the probe are ionized by the electrospray phenomenon.

In the case where a sample plate for a PESI ion source according to the second aspect of the present invention is used for a measurement of a solid sample, such as a biological tissue section, the sample is prepared as follows:

With the lid of the sample plate opened, a sample of an appropriate size is placed in the concave portion of the main body. The lower side of the opening bored in the lid is smaller in size than the top opening of the concave portion. Therefore, when the lid is closed after the sample has been placed in the concave portion, the bottom wall surface of the lid surrounding the opening comes in contact with and presses the sample contained in the concave portion. Since the circumferential portion of the bottom surface of the concave portion is in the form of a groove which is one level lower than the sample placement platform, a portion of the pressed sample escapes into this groove portion. Meanwhile, the sample within the opening does not receive the pressure. The lower side of this sample is supported by the sample placement platform. Therefore, a portion of the sample bulges into the opening. By allowing a portion of the pressed sample to escape into the groove portion, the present sample plate makes an appropriate amount of sample bulge into the opening of the lid while preventing, for example, the squeezed sample from being sputtered upward from the sample plate.

Subsequently, as with the sample plate according to the first aspect of the present invention, an appropriate amount of solvent is injected (or dropped) into the opening. Thus, the solvent is stored in the space above the sample held on the sample placement platform, being in contact with the same sample. The sample plate with the sample prepared in this manner is set at a predetermined position in the PESI ion source in the mass spectrometer, and the measurement is performed. The tip of the lowered probe is inserted into the through hole of the lid and pierces the sample. The probe is subsequently lifted, with a trace amount of sample adhered to the tip of the probe. This sample adhered to the tip of the probe has a sufficient amount of solvent adhered, since the sample passes through the solvent during the lifting motion. In this state, a high voltage is applied to the probe, whereby the components in the sample on the tip of the probe are ionized by the electrospray phenomenon.

In a preferable mode of the sample plate for an PESI ion source according to the first aspect of the present invention, a groove is formed in one or both of the concave portion in the main body and the convex portion on the lid so that a space into which a portion of the sample is allowed to escape is formed within the concave portion when the lid is closed so as to cover the top surface of the main body.

According to this configuration, a space into which a portion of the sample can escape, or in other words, a space into which a portion of the sample can move while changing its shape, is also present in the sample plate for a PESI ion source according to the first aspect of the present invention, as with the sample plate for a PESI ion source according to the second aspect of the present invention. Therefore, the present sample plate can make an appropriate amount of sample bulge into the opening of the lid while preventing the squeezed sample from being sputtered upward from the sample plate, for example.

The sample plate for a PESI ion source according to the first or second aspect of the present invention allows a liquid sample to be injected into the opening and the concave portion when the lid is closed, instead of placing a solid sample in the concave portion. In that case, a certain minimum amount of liquid sample needs to be injected in order to perform the measurement with a high level of accuracy and sensitivity.

In view of this requirement, a sample plate for a PESI ion source according to a different aspect of the present invention has substantially the same external shape as the sample plate for a PESI ion source according to the first or second aspect of the present invention, and includes:

a main body in which a concave portion that is identical in shape to the previously described concave portion is formed, and a substantially plate-shaped lid in which a cylindrical opening that is identical in size to the top opening of the concave portion is formed.

In the sample plate for a PESI ion source according to this aspect of the present invention, the amount of liquid that can be stored in the opening and the concave portion can be increased by changing the size of the opening bored in the lid. Therefore, a sufficient amount of liquid sample can be secured for a measurement, and a sample plate that is suited for the measurement of a liquid sample can be obtained.

By having substantially the same external shape as the sample plate for a PESI ion source according to any of the previously described aspects of the present invention which is mainly used for the measurement of a solid sample, any of those sample plates can be put into a plate holder section in the PESI ion source. Accordingly, it is possible to perform the measurement for a plurality of samples while sequentially replacing one sample with another a measurement regardless of whether the sample is a solid sample or liquid sample, so that the measurement efficiency can be dramatically improved. Since the main bodies of the sample plates are common to both the measurement of a solid sample and that of a liquid sample, the lowest point to which the probe should be lowered in the measurement can be set at the same position for both the measurement of a solid sample and that of a liquid sample. This facilitates the control of the probe. The common design of the main bodies of the sample plates for both the measurement of a solid sample and that of a liquid sample also reduces the manufacturing cost of the sample plate.

In the sample plate for a PESI ion source according to the aforementioned different aspect of the present invention, i.e. in the sample plate for the measurement of a liquid sample, the opening may preferably be configured to have an inner diameter which is a predetermined amount larger than the outer diameter of a base portion of the probe in a PESI ion source in which the sample plate is to be used.

In a PESI ion source, the position of the probe within a plane which is orthogonal to the lowering direction (vertical direction) needs to be adjusted so that the lowered probe will assuredly come in contact with the sample prepared on the sample plate. The sample plate having the previously described configuration helps this task as follows: In place of the probe, a cylindrical pipe having the same outer diameter as the base portion of the probe is fitted in the probe holder which holds the base portion of the probe in the PESI ion source, and the positional adjustment is performed so that the cylindrical pipe will correctly enter the opening of the sample plate when the pipe is lowered. As a result, the position of the probe is properly adjusted. Thus, the positional adjustment of the probe can be correctly and easily performed by using the sample plate for a measurement of a sample.

A sample plate for a PESI ion source according to still another aspect of the present invention is a sample plate for a probe electrospray ionization (PEST) ion source, including a substantially plate-shaped base body in which a plurality of concave portions each of which is capable of containing a liquid are formed, where each of the concave portions has a passage formed in the base body so as to allow a liquid to flow between the concave portion concerned and at least one of the other concave portions.

In the sample plate for a PESI ion source according to this aspect of the present invention, a liquid can flow from one concave portion to another through a passage. Therefore, for example, a liquid sample, reagent or similar substance can be gradually supplied from one concave portion through the passage to another liquid sample contained in another concave portion, so as to gradually promote a chemical reaction and perform a continuous measurement during the reaction process. As another example, a plurality of different liquid samples can be supplied from a plurality of concave portions through their respective passages to another concave portion to induce a reaction in this concave portion. The flow rate (flow velocity) can be controlled by the inclination, cross section and other parameters of the passage. This allows for the control of the reaction rate or other conditions of the reaction induced in the previously described manner.

A switching mechanism may be provided in the passage for some purposes, e.g. in order to mix a specific sample or reagent at a specific timing, or discontinue the mixing. Such a switching mechanism may preferably be configured to be mechanically or electrically operable from the outside.

A mass spectrometer according to the present invention includes a PESI ion source which includes a plate holder section configured to hold a sample plate for a PESI ion source according to any of the previously described aspects of the present invention, the PESI ion source configured to collect a sample from the sample plate held by the plate holder section onto the tip of a probe and to ionize a component in the collected sample.

In the mass spectrometer according to the present invention, various samples can be successively subjected to a measurement, regardless of whether the sample is a solid sample or liquid samples, by sequentially putting one sample plate after another in the plate holder section. A handling device for attaching and removing a sample plate to and from the plate holder section may be provided to automatically perform a continuous measurement for a plurality of samples. The use of the sample plates having substantially the same external shape regardless of the type of sample is beneficial for the attachment and removal of the sample plate by such a handling device.

Advantageous Effects of Invention

A sample plate for a PESI ion source according to the present invention can securely hold a biological tissue section or similar solid sample and allow a probe to pierce the sample. Furthermore, a solvent can be made to adhere to the solid sample in the process of lowering and lifting the probe. Accordingly, for example, when a measurement is performed multiple times for the same sample, the sample can be collected from almost the same site, and the solvent can be assuredly adhered to the sample to perform satisfactory ionization. Consequently, the accuracy and sensitivity of the measurement will be improved. Since there is no need to additionally provide a mechanism for supplying a solvent to the sample, the PESI ion source can be simpler in structure, which lowers the cost of the device. Having samples prepared beforehand in the sample plates facilitates the task of replacing the samples in the middle of the measurement. This helps improve the measurement efficiency.

BRIEF DESCRIPTION OF DRAWINGS

FIG. 2A is a top view, FIG. 2B is a front view, FIG. 2C is a side view, and FIG. 2D is a side view with the lid opened.

FIGS. 8A and 8B are vertical sectional views of the sample-holding section in a sample plate for solid-sample measurement which is still another embodiment of the present invention.

FIGS. 9A-9C are vertical sectional views for explaining the steps of placing a sample in the sample plate shown in FIGS. 8A and 8B.

FIG. 10A is a top view, FIG. 10B is a front view, and FIG. 10C is a side view.

FIG. 12A is a top view, FIG. 12B is a front view, and FIG. 12C is a side view.

DESCRIPTION OF EMBODIMENTS

Figure 1:
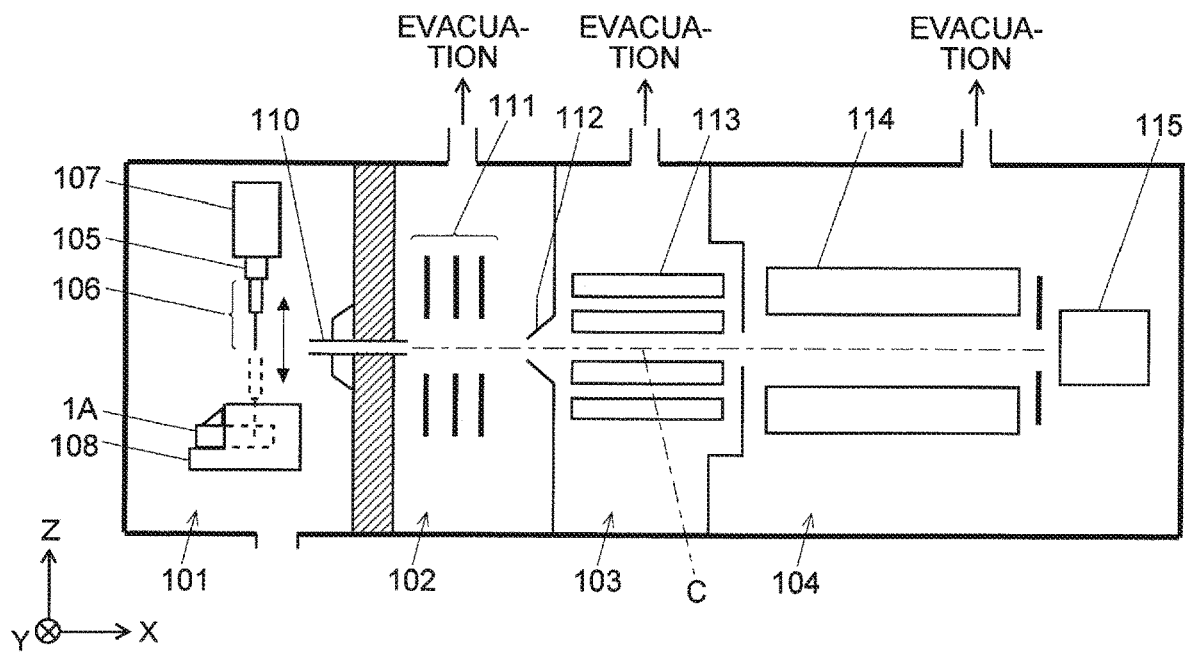
FIG. 1 is a schematic configuration diagram of one embodiment of a mass spectrometer using a sample plate according to the present invention.

One embodiment of the mass spectrometer in which a sample plate according to the present invention is used is hereinafter described. FIG. 1 is a configuration diagram showing the main components of the mass spectrometer according to the present embodiment.

As shown in FIG. 1, the present mass spectrometer has the configuration of a multistage differential pumping system including an ionization chamber 101 for ionizing a component in a sample in an ambience of atmospheric pressure and an analysis chamber 104 for performing the mass spectrometry and detection of ions in a high-vacuum ambience, with a plurality of (in the present embodiment, two) intermediate vacuum chambers 102 and 103 located in between having their degrees of vacuum increased in a stepwise manner.

Within the ionization chamber 101 maintained at substantially atmospheric pressure, a plate holder 108 for holding a sample plate 1A (or 1B or 1C, which will be described later) is provided. A metallic probe 106 held by a probe holder 105 and extending in the vertical direction (Z-axis direction) is located above the plate holder 108. The probe holder 105 with the probe 106 fitted can be driven in the vertical direction (Z-axis direction) by a probe drive mechanism 107 including a motor, speed reducer and other elements. The probe 106 and the probe holder 105 can also be manually driven in each of the two directions of X and Y axes by means of a rack and pinion or similar mechanism (not shown). This allows for the positional adjustment of the probe 106 in the X-Y plane. Additionally, a high voltage of up to several kV (with a switchable polarity) can be applied from a high-voltage power source (not shown) to the probe 106.

The inner space of the ionization chamber 101 communicates with that of the first intermediate vacuum chamber 102 through a thin capillary tube 110. Due to the pressure difference between the two open ends of the capillary tube 110, the gas within the ionization chamber 101 is drawn into the first intermediate vacuum chamber 102 through the capillary tube 110. The first intermediate vacuum chamber 102 contains an ion guide 111 composed of a plurality of plate electrodes arranged along the ion beam axis C and surrounding the same axis C. The inner space of the first intermediate vacuum chamber 102 communicates with that of the second intermediate vacuum chamber 103 through a small hole formed at the apex of a skimmer 112. The second intermediate vacuum chamber 103 contains an octapole ion guide 113 having eight rod electrodes arranged around the ion beam axis C. The analysis chamber 104 contains a quadrupole mass filter 114 having four rod electrodes arranged around the ion beam axis C, as well as an ion detector 115.

As will be described later in detail, the sample plate 1A contains a sample to be subjected to a measurement. When the probe 106 is lowered to a predetermined position by the probe drive mechanism 107, a trace amount of sample adheres to the tip of the probe 106. After the probe 106 is lifted to a predetermined position, a high voltage is applied to the probe 106. This voltage creates an electric field concentrated on the tip of the probe 106, inducing the electrospray phenomenon by which the components in the sample adhered to the probe 106 are ionized. The generated ions are drawn into the capillary tube 110 due to the pressure difference mentioned earlier, and are sequentially transported through the first intermediate vacuum chamber 102 and the second intermediate vacuum chamber 103 into the analysis chamber 104 due to the effect of the electric fields respectively created by the ion guides 111 and 113. Those ions are introduced into the quadrupole mass filter 114. Only an ion having a specific mass-to-charge ratio corresponding to a voltage applied to the rod electrodes of the quadrupole mass filter 114 is allowed to pass through this filter 114 and reach the ion detector 115. The ion detector 115 generates a detection signal corresponding to the amount of ions which have reached the detector.

For example, a detection signal corresponding to the amount of target component in a sample can be obtained by setting the voltage applied to the rod electrodes of the quadruple mass filter 114 so that only an ion originating from the target component will be allowed to pass through the quadrupole mass filter 114.

One embodiment of the sample plate according to the present invention is hereinafter described with reference to FIGS. 2A-5.

Figure 2A:
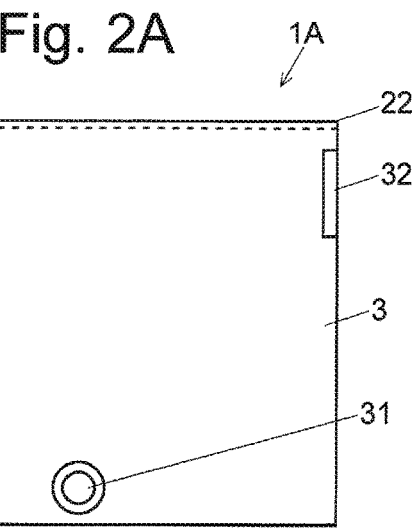
FIGS. 2A-2D are external views of a sample plate for solid-sample measurement as one embodiment of the present invention, where
Figure 2D:
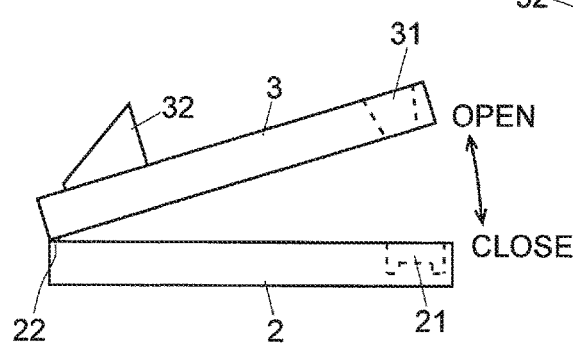
Figure 2C:
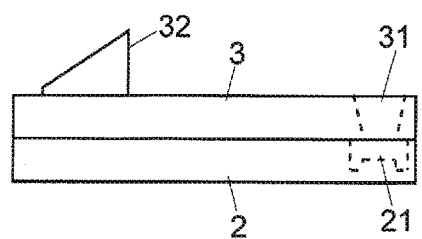
Figure 2B:
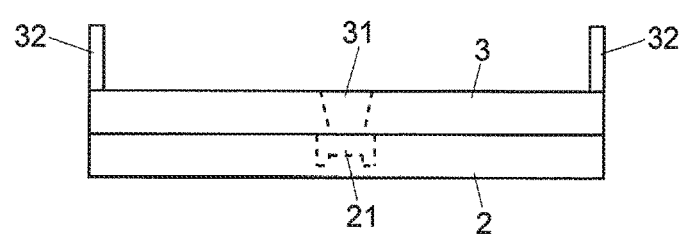
Figure 3A:
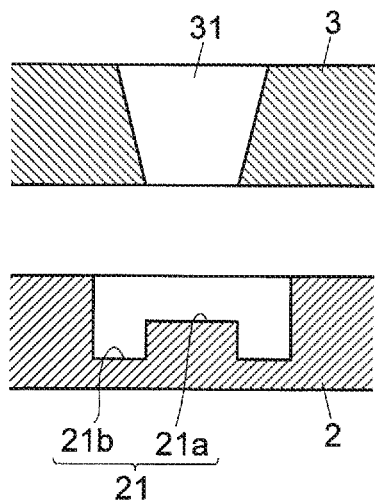
FIGS. 3A and 3B are vertical sectional views of a sample-holding section in the sample plate according to the present embodiment.
Figure 3B:
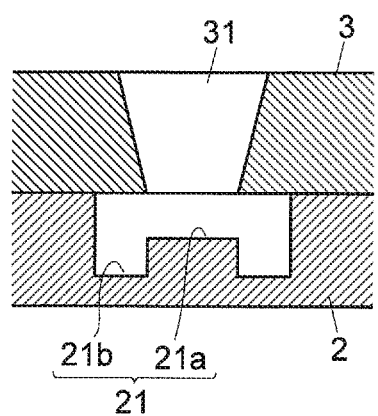
Figure 4A:
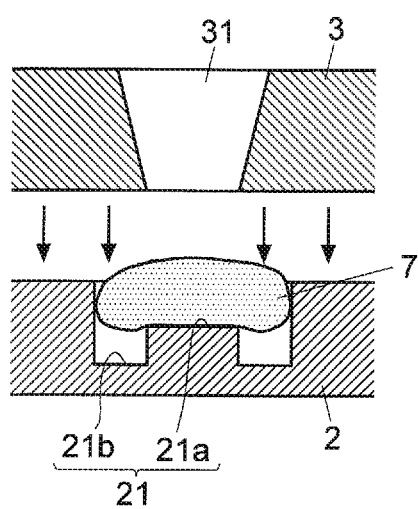
FIG. 4A-4C are vertical sectional views for explaining the steps of placing a sample in the sample plate according to the present embodiment.
Figure 4B:
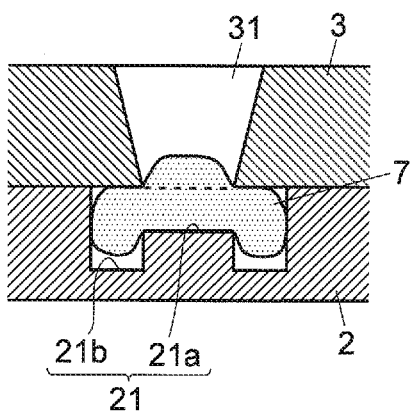
Figure 4C:
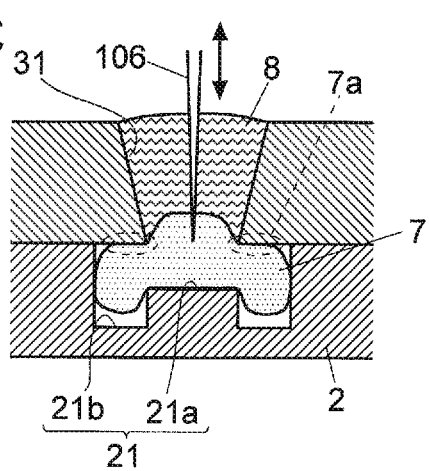
Figure 5:
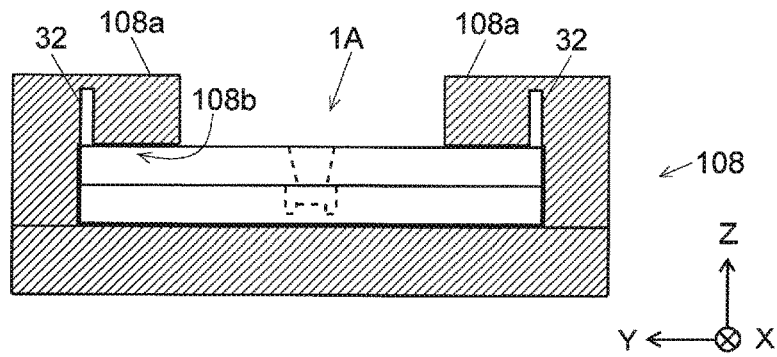
FIG. 5 is a plan view of the sample plate according to the present embodiment put in a plate holder of the mass spectrometer according to the present embodiment.

FIGS. 2A-2D are external views of the sample plate 1A for a solid sample as one embodiment of the present invention, where FIG. 2A is a top view, FIG. 2B is a front view, FIG. 2C is a side view, and FIG. 2D is a side view with the lid opened. FIGS. 3A and 3B are vertical sectional views of a sample-holding section in the sample plate 1A for a solid sample. FIGS. 4A-4C are vertical sectional views for explaining the steps of placing a sample in the sample plate 1A for a solid sample. FIG. 5 is a plan view of the sample plate 1A for a solid sample put in the plate holder 108 of the mass spectrometer shown in FIG. 1, as viewed from the left side in FIG. 1.

As shown in FIGS. 2A-2D, the sample plate 1A for a solid sample includes a main body 2 which is substantially plate shaped and a lid 3 which is also substantially plate shaped. The lid 3 is connected to the main body 2 by a hinge section 22. When the lid 3 is closed so as to cover the top surface of the main body 2, the entire sample plate 1A is substantially in the form of a flat rectangular parallelepiped. These parts are all made of resin, such as polypropylene.

A concave portion 21 for containing a sample (normally, a solid sample) is formed at a predetermined position in the main body 2. As shown in FIGS. 3A and 3B, the concave portion 21 has a sample placement platform 21a in the form of a flat column protruding from a central area of the bottom surface of the concave portion 21. This sample placement platform 21a is surrounded by a groove portion 21b which is substantially ring shaped as viewed from above. The groove portion 21b is one level lower than the top surface of the sample placement platform 21a. On the other hand, the lid 3 has a funnel-shaped opening 31 penetrating the lid 3 in the top-to-bottom direction at a position above the concave portion 21 when the lid 3 is closed as shown in FIG. 2C. The inner diameter of the opening 31 on the upper side is larger than that of the same opening on the lower side. The inner diameter of this opening 31 on the lower side is roughly the same as the diameter of the sample placement platform 21a in the concave portion 21.

The sample plate 1A for a solid sample is typically suitable for a measurement of a solid sample which is comparatively soft, such as a tissue section collected from a living organism. A procedure for setting a sample in the sample plate 1A for a solid sample is as follows: Initially, with the lid 3 sufficiently opened, a small piece of sample 7 is placed in the concave portion 21 of the main body 2 with a pair of tweezers or similar tool, as shown in FIG. 4A. The sample 7 should preferably have a size that is one size smaller than the concave portion 21 as viewed from above and a height that is slightly larger than the depth of the concave portion 21 at the sample placement platform 21a. Subsequently, the lid 3 is closed, as shown in FIGS. 2B and 2C.

Though not shown in the figures, the main body 2 and the lid 3 respectively have latch mechanisms (e.g. a claw and an opening or projection on which the claw is to be hooked) which can be engaged with each other to hold the lid 3 in the closed position. An operator closes the lid 3 to a position where the lid 3 is maintained in the closed state by the action of the latch mechanisms.

When the lid 3 is closed, the lower wall surface (the surface which comes in contact with the main body 2) surrounding the opening 31 of the lid 3 comes in contact with the sample 7, as shown in FIG. 4B, and presses the sample 7 downward. Since the groove portion 21b in the concave portion 21 is one level lower than the sample placement platform 21a, the pressed sample 7 escapes into the groove portion 21b. Meanwhile, since the opening 31 is present immediately above the sample placement platform 21a, the central portion of the sample 7 bulges upward and enters the opening 31. Thus, the sample 7 is held in a stable form, being sandwiched between the main body 2 and the lid 3.

After the lid 3 is closed, the operator injects a predetermined amount of solvent into the opening 31. Since the lower side of the opening is almost completely closed by the sample 7, the opening 31 effectively functions as a solvent container. That is to say, as shown in FIG. 4C, the solvent 8 will be stored above the sample 7 held on the sample placement platform 21a. Since the area which surrounds the opening 31 on the lower wall surface of the lid 3 is almost completely in contact with the sample 7 (at the site indicated by reference sign 7a in FIG. 4C), this area exhibits a high degree of liquid tightness. Therefore, the solvent injected into the opening 31 will not leak into the concave portion 21. This reduces the amount of unnecessary use of the solvent.

After the solvent is injected into the opening 31 in the previously described manner, the sample plate 1A for a solid sample is put into the metallic plate holder 108. As shown in FIG. 5, the plate holder 108 has an insertion slot 108b into which the sample plate 1A for a solid sample can be inserted. As the sample plate 1A for a solid sample is inserted into this insertion slot 108b, a pair of stoppers 32 extending upward from the lid 3 come in contact with the upper guides 108a on the upper side of the insertion slot 108b. The position where the stoppers 32 come in contact with the upper guides 108a is the correct measurement position for the sample plate 1A for a solid sample held in the plate holder 108. That is to say, by pushing the sample plate 1A for a solid sample into the insertion slot 108b until the stoppers 32 come in contact with the upper guide 108a, the sample plate 1A for a solid sample can always be set at the correct measurement position.

Under the condition that the probe 106 has been correctly positioned in the X-Y plane in a manner to be described later, when the sample plate 1A for a solid sample is set at the correct measurement position in the plate holder 108 in the previously described manner, the probe 106 being lowered will be inserted into a roughly central area of the opening 31. Therefore, when the probe 106 is lowered to the lowest predetermined point as shown in FIG. 4C, the tip of the probe 106 passes through the solvent 8 and eventually pierces the sample 7. This barely causes the sample 7 to change its position, since the sample 7 is held by a sufficient pressure. The probe 106 which has pierced the sample 7 is subsequently lifted. During this motion, the trace amount of sample adhered to the tip of the probe 106 passes through the solvent 8. Thus, a sufficient amount of solvent adheres to the trace amount of sample which has been adhered to the tip of the probe 106. After the probe 106 is lifted to a predetermined position, a high voltage is applied to the probe 106, whereupon a considerable number of fine electrically charged droplets are ejected from the sample, whereby the components in the sample are satisfactorily ionized.

As described so far, a component in a sample can be satisfactorily ionized and subjected to mass spectrometry by using the sample plate 1A for a solid sample according to the present embodiment. Consequently, a high level of measurement accuracy and sensitivity can be achieved.

In the sample plate 1A for a solid sample according to the previously described embodiment, the configuration of the sample-holding section shown in FIGS. 3A and 3B may be appropriately modified. Modified examples of the sample-holding section are hereinafter described.

Figure 6A:
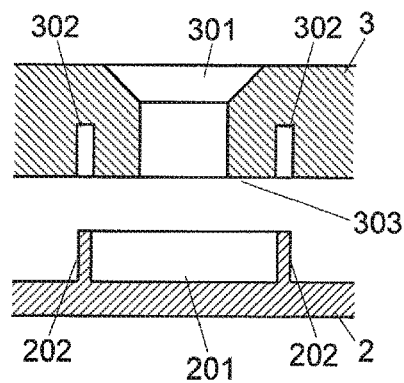
FIGS. 6A and 6B are vertical sectional views of the sample-holding section in a sample plate for solid-sample measurement which is another embodiment of the present invention.
Figure 6B:
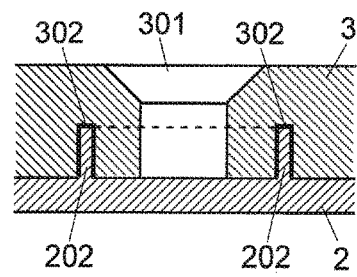
Figure 7A:
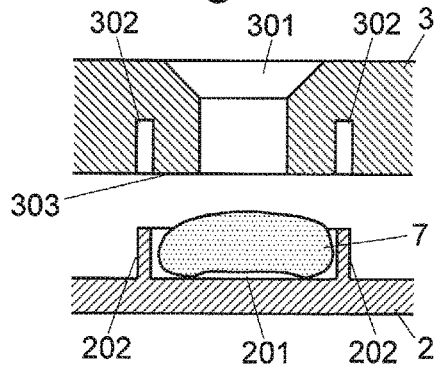
FIGS. 7A-7C are vertical sectional views for explaining the steps of placing a sample in the sample plate shown in FIGS. 6A and 6B.
Figure 7B:
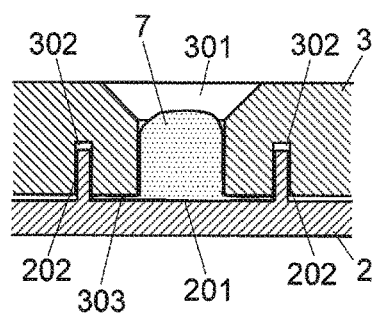
Figure 7C:
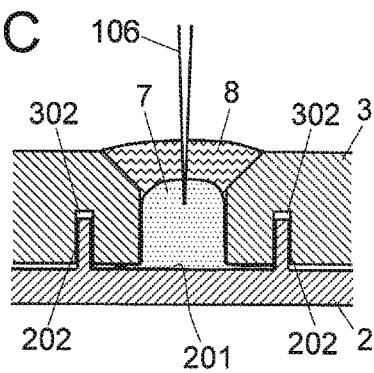

FIGS. 6A and 6B are vertical sectional views of a sample plate for solid-sample measurement which is another embodiment of the present invention. FIGS. 7A-7C are vertical sectional views for explaining the steps of placing a sample in the sample plate shown in FIGS. 6A and 6B.

As shown in FIG. 6A, a projection 202 protruding upward in the form of a flat cylinder is formed at a predetermined position on the main body 2. The area surrounded by this projection 202 serves as the concave portion 201 for containing a sample. On the other hand, as shown in FIG. 6B, the lid 3 has a mating groove 302 in the form of a cylinder to be mated with the projection 202 when the lid 3 is closed. The portion surrounded by this mating groove 302 is a convex portion 303 to be mated with the concave portion 201. An opening 301 penetrating through this convex portion 303 in the top-to-bottom direction is bored at the center of the convex portion 303.

A procedure for setting a solid sample, such as a biological tissue section, is as follows: Initially, with the lid 3 sufficiently opened, a sample 7 is placed in the concave portion 201 of the main body 2 with a pair of tweezers or similar tool, as shown in FIG. 7A. Subsequently, the lid 3 is closed. Then, as shown in FIG. 7B, the lower surface of the convex portion 303 of the lid 3 squeezes a portion of the sample 7. Since the sample 7 is soft, a portion of the pressed sample 7 escapes into the opening 301. Consequently, the sample 7 significantly bulges within the opening 301. Thus, the sample 7 is held in a stable form, being sandwiched between the main body 2 and the lid 3. After that, similar to the previous embodiment, a solvent is injected into the opening 301, the sample plate is set in the plate holder section, and the measurement is performed. In the measurement, as shown in FIG. 7C, the lowered probe 106 pierces the sample 7 to make a trace amount of sample 7 adhere to the probe 106 and be subjected to the measurement.

FIGS. 8A and 8B are vertical sectional views of the sample-holding section in a sample plate for solid-sample measurement which is still another embodiment of the present invention which is an improved version of the sample plate for solid-sample measurement described with reference to FIGS. 6A and 6B as well as FIGS. 7A-7C. FIGS. 9A-9C are vertical sectional views for explaining the steps of placing a sample in the sample plate shown in FIGS. 8A and 8B. In the case of the sample plate for solid-sample measurement described with reference to FIGS. 6A and 6B as well as FIGS. 7A-7C, there is practically no space into which the sample pressed by the convex portion 303 can escape when the lid 3 is closed, so that the pressed sample will be squeezed. By comparison, the sample plate for solid-sample measurement shown in FIGS. 8A and 8B as well as FIGS. 9A-9C has a space into which the pressed sample can escape.

As shown in FIG. 8A, a projection 212 protruding upward in the form of a flat cylinder is formed at a predetermined position on the main body 2. The area surrounded by this projection 212 serves as the concave portion 211 for containing a sample. This concave portion 211 has a groove portion 213 formed roughly at the center of the bottom surface of the concave portion. The groove portion 213 is one level lower than the other areas. There is no specific limitation on the shape of this groove portion 213. On the other hand, as shown in FIG. 8B, the lid 3 has a ring-shaped insertion groove 312 into which the projection 212 is to be inserted when the lid 3 is closed. The area surrounded by this insertion groove 312 serves as the convex portion 313 to be inserted into the concave portion 211. An opening 311 penetrating through this convex portion 313 in the top-to-bottom direction is bored at the center of the convex portion 313. The width of the insertion groove 312 in the radial direction is considerably larger than that of the projection 212 in the radial direction. Therefore, when the lid 3 is closed, a ring-shaped space 214 is formed between the inner wall surface of the projection 212 and the circumferential surface of the convex portion 313, as shown in FIG. 8B.

A procedure for setting a solid sample, such as a biological tissue section, is as follows: Initially, with the lid 3 sufficiently opened, a sample 7 is placed in the concave portion 211 of the main body 2 with a pair of tweezers or similar tool, as shown in FIG. 9A. Subsequently, the lid 3 is closed. Then, as shown in FIG. 9B, the lower surface of the convex portion 313 of the lid 3 presses a portion of the sample 7. While a portion of this sample 7 is squeezed, the largest portion of the pressed sample 7 escapes into the outer space 214 or groove portion 213. Meanwhile, the sample 7 also bulges within the opening 311. Thus, the sample 7 is held in a stable form, being sandwiched between the main body 2 and the lid 3. After that, similar to the previous embodiment, a solvent is injected into the opening 311, the sample plate is set in the plate holder section, and the measurement is performed. In the measurement, as shown in FIG. 9C, the lowered probe 106 pierces the sample 7 to make a trace amount of sample 7 adhere to the probe 106 and be subjected to the measurement.

This configuration significantly reduces the amount of squeezed sample and prevents the squeezed sample from being sputtered upward from the sample plate and scattered over the surrounding area or adhering to the operator. Therefore, for example, even if the sample is possibly contaminated with microorganisms, a high level of security can be ensured.

Subsequently, a sample plate for a liquid sample which is still another embodiment of the sample plate according to the present invention is described with reference to FIGS. 10A-10C and FIGS. 11A-11C.

Figure 10A:
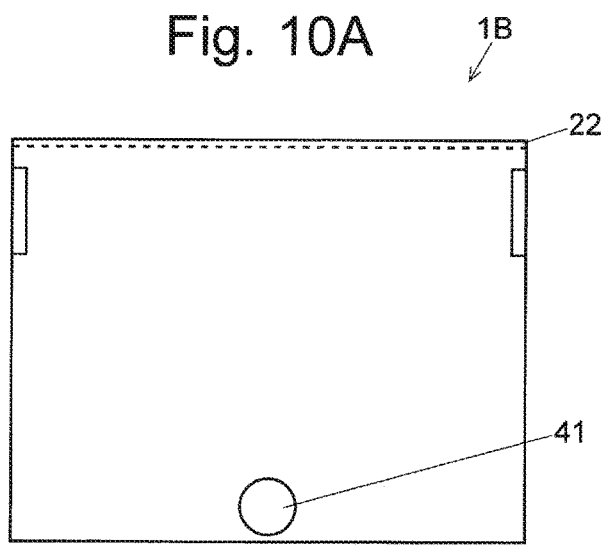
FIGS. 10A-10C are external views of a sample plate for liquid-sample measurement which is another embodiment of the present invention, where
Figure 10B:
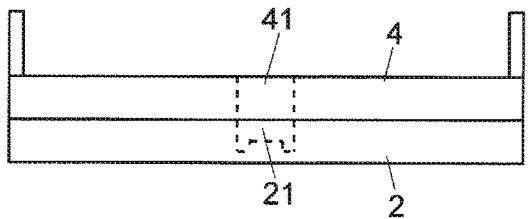
Figure 10C:
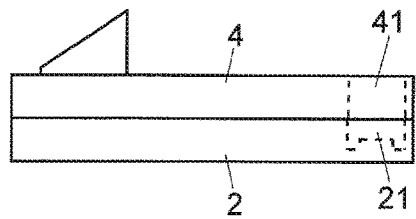
Figure 11A:
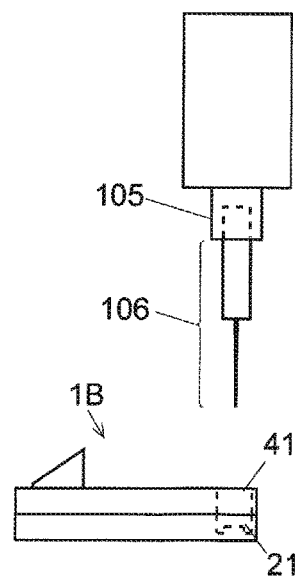
FIGS. 11A-11C are diagrams for explaining the steps of adjusting the position of the probe using the sample plate shown in FIGS. 10A-10C.
Figure 11B:
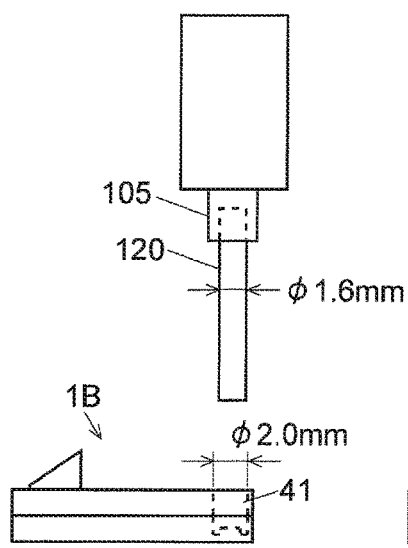
Figure 11C:
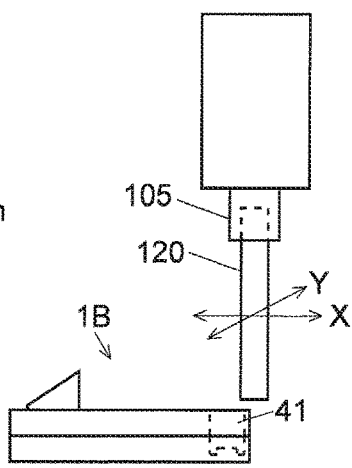

FIGS. 10A-10C are external views of a sample plate 1B for a liquid sample as one embodiment of the present invention, where FIG. 10A is a top view, FIG. 10B is a front view, and FIG. 10C is a side view. FIGS. 11A-11C are diagrams for explaining the steps of adjusting the position of the probe 106 using the sample plate 1B for a liquid sample.

Similar to the sample plate 1A for a solid sample, the sample plate 1B for a liquid sample includes a main body 2 which is substantially plate shaped and a lid 4 which is also substantially plate shaped. The cover 4 is connected to the main body 2 by a hinge section 22. The main body 2 is completely identical to that of the sample plate 1A for a solid sample, including the shape and position of the concave portion 21. Therefore, the main body 2 is denoted by the same reference sign. On the other hand, the opening 41 formed in the lid 4 has a cylindrical shape, which is different from the shape of the opening 31 formed in the lid 3 in the sample plate 1A for a solid sample. The cylindrical opening 41 is configured to be combined with the concave portion 21 to form a reservoir for containing a liquid sample. The reservoir in the present embodiment has a considerably small capacity of 9 μL. It is naturally possible to appropriately change its capacity.

In the case of a liquid sample, it is unnecessary to separate the sample plate into the main body 2 and the lid 4, since the liquid sample merely need to be injected into a reservoir which is formed when the lid 4 is closed. However, the configuration as shown in FIGS. 10A-10C is adopted in the present embodiment in order to share the same configuration with the sample plate 1A for a solid sample. The sample plate 1B for a liquid sample has the same external shape as the sample plate 1A for a solid sample. The position of the openings 31 and 41 as well as those of the stoppers and the concave portion 21 are also the same. Therefore, the sample plate 1B into which the liquid sample has been injected in the previously described manner can be put into the plate holder 108 in a similar manner to the sample plate 1A for a solid sample to perform a measurement and acquire detection signals for a component in the liquid sample Since the main body 2 of the sample plate 1B for a liquid sample is completely identical to that of the sample plate 1A for a solid sample, the lowest point to which the probe 106 should be lowered in a measurement may normally be set at the same position. That is to say, it is unnecessary to change the position of the lowest point depending on whether the measurement target is a liquid sample or solid sample. In this respect, the setting of the measurement conditions and other related tasks will be simpler.

The sample plate 1B for a liquid sample can be used not only as a sample plate; it can also be used for the positional adjustment of the probe 106 in the X-Y plane. A description concerning this point is hereinafter given with reference to FIGS. 11A-11C.

As shown in FIG. 11A, when a measurement is performed, the probe 106 is fitted in the probe holder 105. When the positional adjustment of the probe 106 is performed, a cylindrical positioning pipe 120 is fitted in the probe holder 105 in place of the probe 106 (see FIG. 11B). The positioning pipe 120 has the same outer diameter as that of the base portion of the probe 106 (i.e. the portion to be held by the probe holder 105). In the present example, the outer diameter of the positioning pipe 120 is 1.6 mm. On the other hand, the inner diameter of the opening 41 of the sample plate 1B for a liquid sample is 2.0 mm, which is one size larger than the outer diameter of the positioning pipe 120. With the positioning pipe 120 fitted in the probe holder 105, the operator lowers the positioning pipe 120 and adjusts the position of the probe holder 105 (and the positioning pipe 120) in each of the two directions of X and Y axes so that the lower end of the positioning pipe 120 will enter the opening 41 of the sample plate 1B for a liquid sample (see FIG. 11C).

Thus, the position of the probe 106 in the X-Y plane can be appropriately adjusted so that the probe 106 will be lowered into a roughly central area of the opening 41 of the sample plate 1B for a liquid sample (or sample plate 1A for a solid sample) located at the correct measurement position.

Figure 12A:
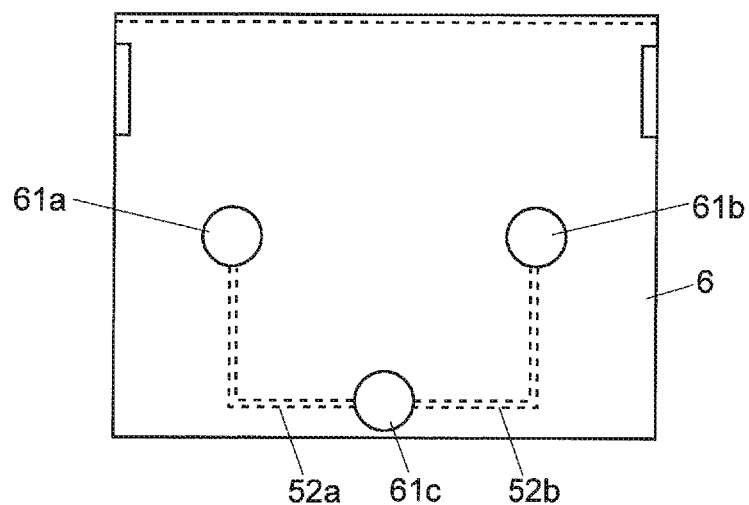
FIGS. 12A-12C are external views of a sample plate for liquid-sample measurement which is still another embodiment of the present invention, where
Figure 12B:
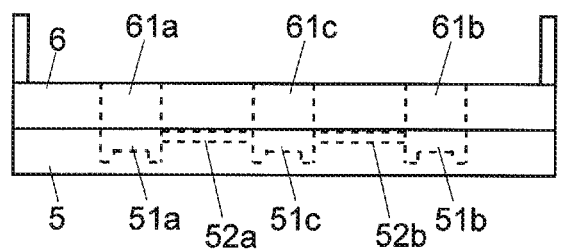
Figure 12C:
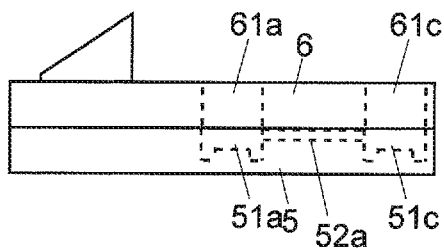

FIGS. 12A-12C are external views of a sample plate 1C for a liquid sample which is still another embodiment of the present invention, where FIG. 12A is a top view, FIG. 12B is a front view, and FIG. 12C is a side view.

The external shape of the sample plate 1C for a liquid sample is completely identical to that of the sample plate 1B for a liquid sample. The present sample plate 1C for a liquid sample has three concave portions 51a, 51b and 51c formed in the main body 5, while the lid 6 has three openings 61a, 61b and 61c bored at positions immediately above the concave portions 51a, 51b and 51c, respectively. The concave portion 51c and the opening 61c are located at the same position as the concave portion 21 and the opening 41 in the sample plate 1B for a liquid sample as viewed from above. A first passage 52a is formed between the concave portion 51a and the concave portion 51c, while a second passage 52b is formed between the concave portion 51b and the concave portion 51c. Each of the first and second passages 52a and 52b may be a simple groove carved in the main body 5.

In the present sample plate 1C for a liquid sample, a first liquid sample is injected into a reservoir formed by the concave portion 51a and the opening 61a when the lid 6 is closed, while a second liquid sample is injected into a reservoir formed by the concave portion 51b and the opening 61b. The first and second liquid samples respectively flow through the passages 52a and 52b into the concave portion 51c, causing a chemical reaction within the concave portion 51c. By putting this sample plate 1C for a liquid sample in the plate holder 108 and repeating a measurement for a certain period of time, a real-time measurement for a sample component which changes with the progress of the reaction can be performed.

The flow rate (flow velocity) of the liquid sample which flows through the passage 52a or 52b can be controlled by appropriately changing the inclination, cross section and/or other parameters of the passage. This also allows for an adjustment of the rate of reaction. Additionally, an appropriate switching mechanism may be provided in each passage to change the timing of the initiation or discontinuation of the supply of a liquid sample or reagent, or to change the flow rate in the middle of the measurement.

In any of the previously described embodiments, one sample is contained in one sample plate. It is naturally possible to design the sample plate so that it can contain a plurality of samples, as with a sample plate for matrix assisted laser desorption/ionization (MALDI). In that case, one or both of the plate holder 108 and the probe holder 105 in the mass spectrometer may be configured to be movable in the X-Y plane and allow for a sequential measurement of a plurality of samples placed at different positions in one sample plate.

Any of the previously described embodiments and their modified examples is a mere example of the present invention, and any change, modification or addition appropriately made within the spirit of the present invention will evidently fall within the scope of claims of the present application.

For example, although any of the previously described sample plates consists of a main body and a lid connected by a hinge section, it is unnecessary to connect the base body and the lid. The entire shape (or the like) of the sample plate is not limited to a substantially flat rectangular-parallelepiped shape, but may be changed to an appropriate shape, such as a disc. Although the mass spectrometer shown in FIG. 1 is a single type quadrupole mass spectrometer, the present invention is also applicable in a different type of mass spectrometer, such as a triple quadrupole mass spectrometer or quadrupole time-of-flight (q-TOF) mass spectrometer. That is to say, as long as the mass spectrometer employs a PESI ion source, there is no specific limitation on the configuration of the mass separator and other sections located in the subsequent stages.

REFERENCE SIGNS LIST

1A . . . Sample Plate for Solid Sample
1B, 1C . . . Sample Plate for Liquid Sample
2, 5 . . . Main Body
21, 51a, 51b, 51c, 201, 211 . . . Concave Portion
21a . . . Sample Placement Platform
21b, 213 . . . Groove Portion
22 . . . Hinge Section
202, 212 . . . Projection
214 . . . Space 3, 4, 6 . . . Lid
31, 41, 61a, 61b, 61c, 301, 311 . . . Opening
302 . . . Mating Groove
303, 313 . . . Convex Portion
312 . . . Insertion Groove
32 . . . Stopper
52a . . . First Passage
52b . . . Second Passage
7 . . . Sample (Solid Sample)
8 . . . Solvent
101 . . . Ionization Chamber
102 . . . First Intermediate Vacuum Chamber
103 . . . Second Intermediate Vacuum Chamber
104 . . . Analysis Chamber
105 . . . Probe Holder
106 . . . Probe
107 . . . Probe Drive Mechanism
108 . . . Plate Holder
108a . . . Upper Guide
108b . . . Insertion Slot
110 . . . Capillary Tube
111, 113 . . . Ion Guide
112 . . . Skimmer
114 . . . Quadrupole Mass Filter
115 . . . Ion Detector
120 . . . Positioning Pipe

The invention claimed is:

1. A sample plate for a probe electrospray ionization (PESI) ion source, comprising:
a substantially plate-shaped main body and a substantially plate-shaped lid configured to be put on a top surface of the main body,
wherein:
the main body includes a concave portion for containing a sample; and
the lid includes a convex portion to be inserted into the concave portion when the lid is closed so as to cover the top surface of the main body, and the convex portion has an opening bored through the convex portion in a top-to-bottom direction.

2. The sample plate for a PESI ion source according to claim 1, wherein:
a groove is formed in one or both of the concave portion in the main body and the convex portion on the lid so that a space into which a portion of the sample is allowed to escape is formed within the concave portion when the lid is closed so as to cover the top surface of the main body.

3. A mass spectrometer, comprising a PESI ion source which includes a plate holder section configured to hold a sample plate for a PESI ion source according to claim 1, the PESI ion source configured to collect a sample from the sample plate held by the plate holder section onto a tip of a probe and to ionize a component in the collected sample.

4. A sample plate for a probe electrospray ionization (PEST) ion source, comprising:
a substantially plate-shaped main body and a substantially plate-shaped lid configured to be put on the top surface of the main body,
wherein:
the main body includes a concave portion for containing a sample, the concave portion having a bottom surface on which a sample placement platform one level higher than a surrounding area is formed; and
the lid has an opening bored through the lid in a top-to-bottom direction at a position above the concave portion when the lid is closed so as to cover the top surface of the main body, where a lower side of the opening is smaller in size than a top opening of the concave portion.

5. A mass spectrometer, comprising a PESI ion source which includes a plate holder section configured to hold a sample plate for a PESI ion source according to claim 4, the PESI ion source configured to collect a sample from the sample plate held by the plate holder section onto a tip of a probe and to ionize a component in the collected sample.

* * * * *